United States Patent
Lenke

(10) Patent No.: US 7,316,545 B2
(45) Date of Patent: Jan. 8, 2008

(54) REDUCING AGENT PUMP FOR AN EXHAUST-GAS AFTERTREATMENT SYSTEM OF AN INTERNAL COMBUSTION ENGINE

(75) Inventor: Sonja Lenke, Regensburg (DE)

(73) Assignee: Argillon GmbH, Redwitz (DE)

( * ) Notice: Subject to any disclaimer, the term of this patent is extended or adjusted under 35 U.S.C. 154(b) by 804 days.

(21) Appl. No.: 10/806,735

(22) Filed: Mar. 23, 2004

(65) Prior Publication Data

US 2004/0179960 A1    Sep. 16, 2004

Related U.S. Application Data

(63) Continuation of application No. PCT/DE02/03596, filed on Sep. 24, 2002.

(30) Foreign Application Priority Data

Sep. 25, 2001   (DE) ................. 101 47 172

(51) Int. Cl.
  F04B 49/10  (2006.01)
  F04B 49/16  (2006.01)
  F01B 31/14  (2006.01)
  F01B 11/02  (2006.01)
(52) U.S. Cl. ............... 417/274; 417/417; 92/60.5; 92/169.1
(58) Field of Classification Search ............. 417/274, 417/417; 92/60.5, 169.1
  See application file for complete search history.

(56) References Cited

U.S. PATENT DOCUMENTS

| | | | | |
|---|---|---|---|---|
| 3,302,582 A | * | 2/1967 | Siegfried | ............ 417/417 |
| 4,455,497 A | * | 6/1984 | Shtrikman | ............ 310/30 |
| 4,895,495 A | * | 1/1990 | Arai | ............ 417/360 |
| 5,073,095 A | * | 12/1991 | Thomas, Sr. | ............ 417/417 |
| 5,320,203 A | | 6/1994 | Wilber et al. | |
| 6,082,102 A | | 7/2000 | Wissler et al. | |
| 6,526,746 B1 | | 3/2003 | Wu | |
| 7,094,041 B2 | * | 8/2006 | Hashimoto et al. | ........ 417/417 |

FOREIGN PATENT DOCUMENTS

| | | |
|---|---|---|
| DE | 36 10 882 C2 | 10/1987 |
| DE | 44 32 577 A1 | 3/1996 |
| DE | 197 43 337 C1 | 1/1999 |
| DE | 101 29 592 A1 | 2/2002 |

* cited by examiner

*Primary Examiner*—Charles G Freay
(74) *Attorney, Agent, or Firm*—Laurence A. Greenberg; Werner H. Stemer; Ralph E. Locher

(57) ABSTRACT

A reducing agent pump has a pump inlet part and a pump outlet part closing off the pump body at its ends. One or both of the inlet and outlet parts is of two-part construction, with a closure element and another element. The two elements are prestressed relative to one another with a spring element, so that in the event of a pressure which exceeds the spring force of the spring element, a relative movement can be carried out between the two elements of the two-part member. This makes it possible to absorb an increase in the volume of the reducing agent inside the pump body caused by freezing and therefore to prevent damage to the reducing agent pump.

8 Claims, 2 Drawing Sheets

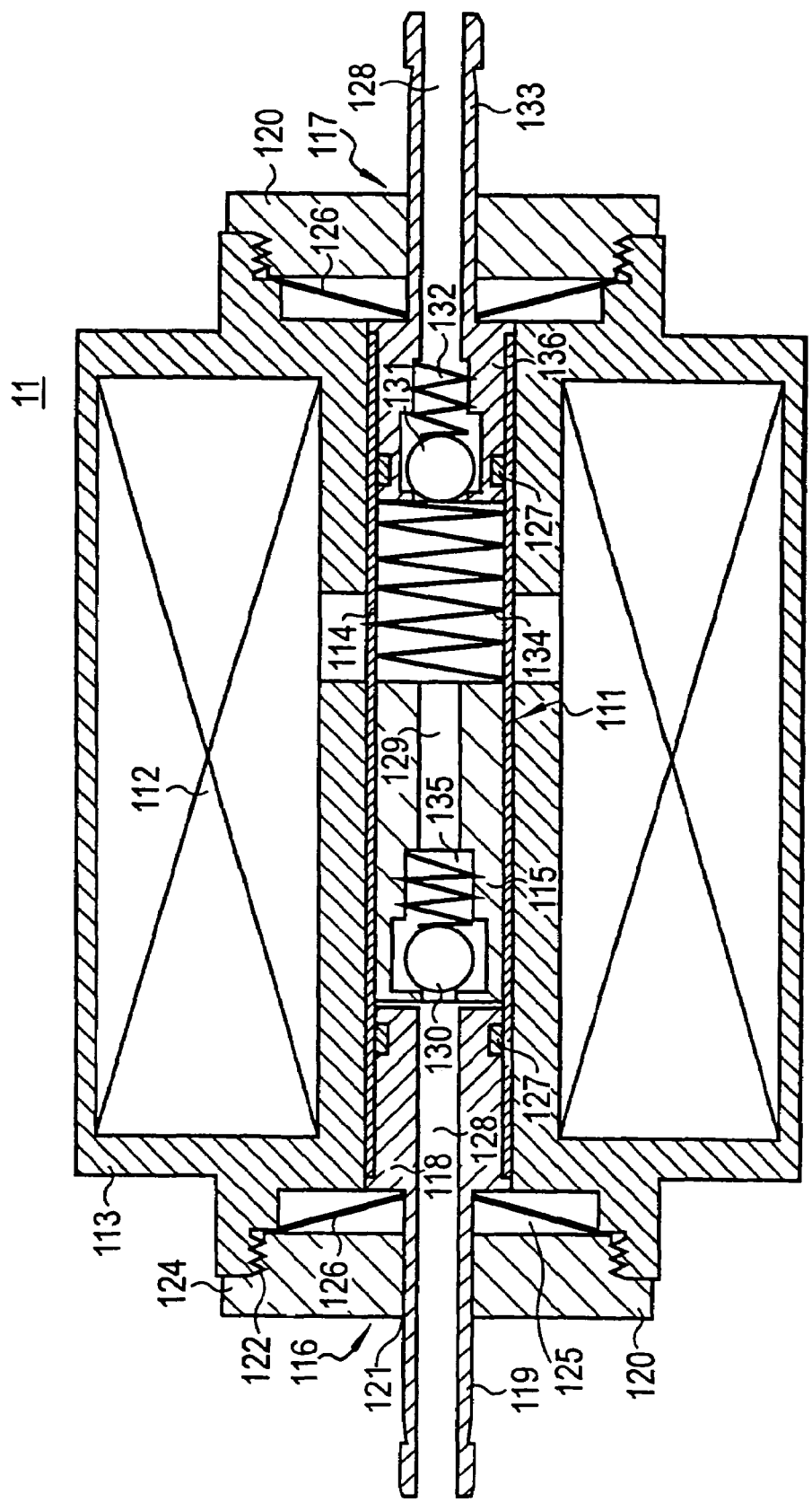

REDUCING AGENT PUMP FOR AN EXHAUST-GAS AFTERTREATMENT SYSTEM OF AN INTERNAL COMBUSTION ENGINE

CROSS-REFERENCE TO RELATED APPLICATION

This application is a continuation, under 35 U.S.C. § 120, of my copending international application PCT/DE02/03596, filed Sep. 24, 2002, which designated the United States; this application also claims the priority, under 35 U.S.C. § 119, of German patent application No. 101 47 172.6, filed Sep. 25, 2001; the prior applications are herewith incorporated by reference in their entirety.

BACKGROUND OF THE INVENTION

Field of the Invention

The invention relates to a reducing agent pump for an exhaust-gas aftertreatment system of an internal combustion engine, that is, to a pump for delivering reducing agent in liquid phase to an exhaust-gas aftertreatment system of an internal combustion engine.

The levels of nitrogen oxide emissions from an internal combustion engine operating with excess air, in particular a diesel internal combustion engine, can be reduced with the aid of a so-called selective catalytic reduction (SCR), wherein atmospheric nitrogen ($N_2$) and water vapor ($H_2O$) are formed. Reducing agents used are either gaseous ammonia ($NH_3$), ammonia in aqueous solution, or urea in aqueous solution. The urea serves as an ammonia carrier and is injected into the exhaust system upstream of a hydrolysis catalytic converter with the aid of a metering system. Then it is converted into ammonia by means of hydrolysis in the hydrolysis catalytic converter, and the ammonia then in turn reduces the nitrogen oxides in the actual SCR or deNOx catalytic converter.

The main components of a metering system of this type include a reducing agent tank, a pump, a pressure regulator, a pressure sensor, and a metering valve. The pump delivers the reducing agent stored in the reducing agent tank to the metering valve, by way of which the reducing agent is injected into the exhaust-gas stream upstream of the hydrolysis catalytic converter. The metering valve is driven with signals from a control device in such a manner that a defined, currently required quantity of reducing agent is supplied as a function of operating parameters of the internal combustion engine. See U.S. Pat. No. 6,082,102 and German patent DE 197 43 337 C1.

An advantage of the ammonia-releasing substances which are present in aqueous solutions, such as for example urea, is that in technical terms they are relatively simple to store, handle, deliver and meter. One drawback of these aqueous solutions is that there is a risk that they may freeze at certain temperatures, depending on the concentration of the dissolved substance.

32% strength urea solution, as is typically used as reducing agent in SCR systems, has a freezing point of −11° C. Consequently, it is necessary to provide devices for heating the metering system in order to ensure that all the system components are able to function within a reasonable time of the system being started at ambient temperatures of below −11° C. and to prevent system components from freezing during operation.

One of the main components is the reducing agent pump. Since aqueous urea solution imposes high demands on the seals in the system, on account of its creep properties, in general only pumps without shaft bushings, i.e. only with static seals, are used. Diaphragm pumps as well as reciprocating piston pumps satisfy this condition. It is preferable to use electro-magnetically driven reciprocating piston pumps to meter aqueous urea solution as reducing agent for exhaust-gas aftertreatment in internal combustion engines.

One problem of these reciprocating piston pumps is that in the quiescent state of the pump piston, a liquid volume is in principle enclosed between the piston check valve (nonreturn valve) and the outlet check valve (nonreturn valve). This liquid volume is dependent on the design of the pump but is at least equal to the displacement of the pump piston. If the reducing agent in the pump outlet has already frozen at temperatures below the freezing point of the reducing agent, it is no longer possible to compensate for the increase in volume of the enclosed reducing agent. The piston check valve does not permit any pressure compensation in the direction of the reducing agent tank, and the pump is damaged by the resultant increase in pressure.

German published patent application DE 44 32 577 A1 describes a device for preventing frost damage to parts of an exhaust-gas purification system which operates in accordance with the selective catalytic reduction principle during inoperative periods and for allowing systems of this type to operate at temperatures below the freezing point of the reducing agent solution. For that purpose, the device has a thermally insulated storage tank for the reducing agent solution and a feedline which is connected to the tank and ends in an outlet opening for the liquid. A backwash valve, which can be acted upon by a pressurized gas, is provided in the feedline. The storage tank and the feedline can in this case be heated by way of an electrical heater which supplies a heat exchanger with heat.

German patent DE 36 10 882 C2 describes a double-acting piston pump for delivering liquid with or without solids, having multipart pistons which are fitted to the piston rod and have an inner and outer gasket on the circumference of the piston. A piston base with a stripper ring is arranged on the piston rod. Moreover, a biasing spring is positioned between the two gaskets. The multipart piston comprises a sleeve spring, which is arranged centrically with respect to the biasing spring and has an outer sleeve and an inner sleeve with an elastic element arranged between the two sleeves, the inner sleeve being in a fixed position around the piston rod part, while the outer sleeve together with the stripper ring forms an abutment for the outer gasket. An arrangement of this type provides a frostproof pump. After the delivery medium has been drained or extracted from the pump spaces, with residual medium remaining in the pump interior, the pump itself is not damaged even in the event of a sharp frost. The increase in volume which occurs through the formation of ice in the interior of the pump is compensated for by the expansion of the sleeve spring.

U.S. Pat. No. 6,526,746 B1 and German published patent application DE 101 29 592 A1 describe an on-board configuration for releasing reducing agent for the exhaust pipe of a motor vehicle provided with an internal combustion engine. The system has a nozzle for atomizing the reducing agent into the exhaust pipe, with a transfer pipe being connected to the nozzle for releasing reducing agent. There is a casing with an outlet, which is connected to the transfer tube opposite the nozzle. The casing has a front end which forms a mixing chamber, and a main body with inlets for the compressed air and reducing agent. An electrically operated fluid-dispensing pump with exposed coils is cooled by the air which is supplied to the casing through the compressed-air inlet, with the fluid-dispensing device having an inlet which is connected to the reducing-agent inlet of the casing.

SUMMARY OF THE INVENTION

It is accordingly an object of the invention to provide a reducing agent pump for an aftertreatment system of an internal combustion engine which overcomes the above-mentioned disadvantages of the heretofore-known devices and methods of this general type and which ensures reliable operation of the exhaust-gas aftertreatment system even at temperatures below the freezing point of the reducing agent that is to be delivered by way of the pump.

With the foregoing and other objects in view there is provided, in accordance with the invention, a reducing agent pump for delivering liquid reducing agent to an exhaust-gas aftertreatment system of an internal combustion engine. The novel pump comprises:

a cylindrical pump body;

a coil carrier surrounding the pump body and serving to receive an electromagnet;

a piston disposed to execute an axial movement in the pump body when the electromagnetic is being energized;

a pump inlet part and a pump outlet part closing off the pump body at respective ends thereof, at least one of the pump inlet part and the pump outlet part forming a two-piece part having a first element and a closure element; and a spring element disposed to bias the first element relative to the closure element and to allow a relative movement between the first element and the closure element when a pressure exceeds a spring force of the spring element.

In other words, the concept forming the basis of the invention is that the pump outlet part and/or the pump inlet part closing off the pump body at its ends is/are configured in two parts, with in each case part of the pump inlet part and/or of the pump outlet part being prestressed by means of a spring element with respect to the other part, so that in the event of a pressure which predetermines the spring force of the spring element being exceeded, a relative movement can be carried out between the two parts.

This has the advantage that an increase in the volume of the reducing agent which is present inside the pump body, caused by freezing, can be absorbed and in this way it is possible to prevent damage to the reducing agent pump.

In accordance with an added feature of the invention, at least one of the pump inlet part and the pump outlet part comprises a cylindrical base body forming the first element and projecting into the pump body, and the closure element.

In accordance with an additional feature of the invention, the base body is displaceably mounted in the pump body and the closure element is fixedly connected to the coil carrier.

In accordance with another feature of the invention, the spring element is braced between mutually facing end faces of the base body and the closure element, respectively.

In accordance with a further feature of the invention, the spring element is a cup spring, a spring disc, or a coil spring.

In accordance with again an added feature of the invention, the closure element is screwed to the coil carrier.

In accordance with again another feature of the invention, the base body is formed with a connection piece for receiving a reducing agent line.

In accordance with a concomitant feature of the invention, the base body has a periphery formed with a groove and a radial sealing element mounted in the groove, the sealing element establishing a seal in the event of an axial movement of the base body within the pump body.

Other features which are considered as characteristic for the invention are set forth in the appended claims.

Although the invention is illustrated and described herein as embodied in a reducing agent pump for an exhaust-gas aftertreatment system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic view of a reducing agent pump according to the invention.

DESCRIPTION OF THE PREFERRED EMBODIMENTS

Figure 1:
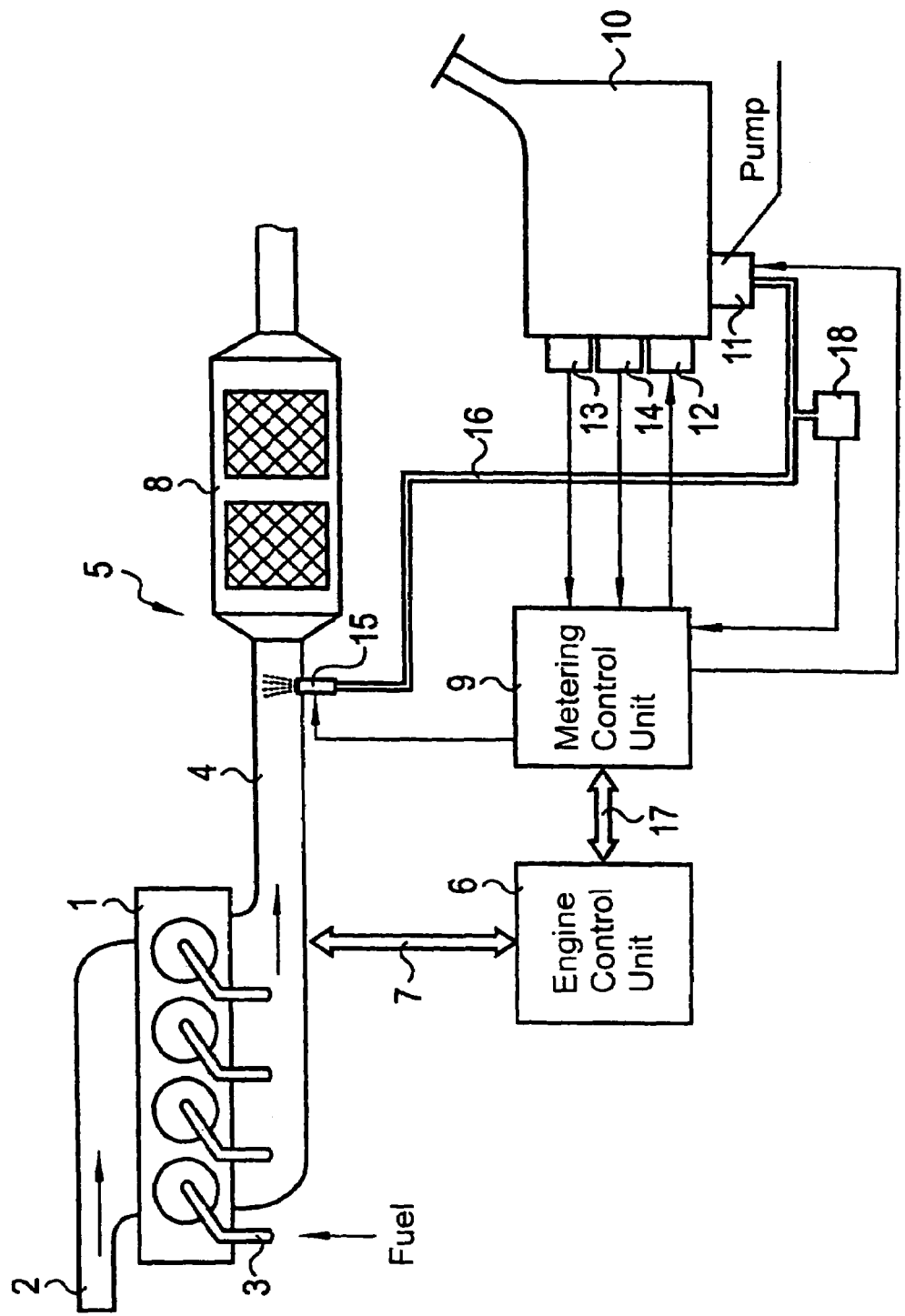
FIG. 1 is a schematic diagram and block diagram illustrating an internal combustion engine with an associated exhaust-gas aftertreatment system wherein the reducing agent pump according to the invention is used.

Referring now to the figures of the drawing in detail and first, particularly, to FIG. 1 thereof, there is shown a highly simplified illustration, in the form of a block diagram, of an internal combustion engine which is operated with excess air, together with an associated exhaust-gas aftertreatment system. The figure illustrates only those parts which are necessary in order to gain an understanding of the invention. In particular, the fuel cycle is not illustrated. In this exemplary embodiment, the internal combustion engine is a diesel engine, and the reducing agent used for the aftertreatment of the exhaust gas is aqueous urea solution.

The air required for combustion is fed to the internal combustion engine 1 via an intake line 2. An injection system, which may be configured, by way of example, as a high-pressure storage injection system (common rail system) with injection valves that inject fuel directly into the cylinders of the internal combustion engine 1, is denoted by reference numeral 3.

The exhaust gas from the internal combustion engine 1 flows via an exhaust pipe 4 to an exhaust-gas aftertreatment system 5 and, from the latter, via a non-illustrated muffler into the open air.

An engine control unit 6 for controlling the internal combustion engine 1 is connected to the internal combustion engine 1 via a data and control line 7, which is only diagrammatically indicated in the figure. Signals from sensors (e.g. temperature sensors for intake air, charge air, coolant, load sensor, speed sensor) and signals for actuators (e.g. injection valves, control elements) are transmitted between the internal combustion engine 1 and the engine control unit 6 via the data and control line 7.

The exhaust-gas aftertreatment system 5 includes a reduction catalytic converter 8, which comprises a plurality of catalytic converter units that are connected in series and are not indicated in any more detail. In addition, an oxidation catalytic converter may be arranged upstream and/or downstream of the reduction catalytic converter 8, although this is not shown. Furthermore, there is a metering control unit 9, which is assigned to a reducing-agent storage tank 10 with an electrically actuable reducing agent pump 11 for delivering the reducing agent.

In the exemplary embodiment, the reducing agent is aqueous urea solution which is stored in the reducing-agent storage tank 10. The latter has an electrical heating device 12 and sensors 13, 14 which record the temperature of the urea solution and the level in the reducing-agent storage tank 10. Moreover, the signals from a temperature sensor arranged upstream of the reduction catalytic converter 8 and from an exhaust-gas measurement pick-up, e.g. an NOx sensor, arranged downstream of the reduction catalytic converter 8 are transmitted to the metering control unit 9.

The metering control unit 9 actuates an electromagnetic metering valve 15, to which urea solution is fed on demand via a feedline 16 from the reducing-agent storage tank 10 with the aid of the reducing agent pump 11. A pressure sensor 18, which records the pressure in the metering system and emits a corresponding signal to the metering control unit 9, is incorporated in the feedline 16. The urea solution is injected into the exhaust pipe 4 by means of the metering valve 15 upstream of the reduction catalytic converter 8.

When the internal combustion engine 1 is in operation, the exhaust gas flows through the exhaust pipe 4 in the direction indicated by the arrow.

The metering control unit 9 is connected to the engine control unit 6 via an electrical bus system 17 so that they can exchange data. The operating parameters which are of relevance to the calculation of the quantity of urea solution to be metered, such as for example the engine speed, air mass, fuel mass, control displacement of an injection pump, exhaust-gas mass flow, operating temperature, charge air temperature, start of injection, etc., are transmitted to the metering control unit 9 via the bus system 17.

Working on the basis of these parameters and the measured values for the exhaust-gas temperature and the NOx content, the metering control unit 9 calculates the quantity of urea solution to be injected and emits a corresponding electrical signal to the metering valve 15 via an electrical connecting line. The urea is hydrolyzed and intimately mixed as a result of being injected into the exhaust pipe 4. The catalytic reduction of the NOx in the exhaust gas to form $N_2$ and $H_2O$ takes place in the catalytic converter units.

The metering valve 15 for introducing the urea solution into the exhaust pipe 4 largely corresponds to a standard low-pressure gasoline injection valve, which is secured releasibly, for example, in a valve-holding device which is fixedly connected to a wall of the exhaust pipe 4.

FIG. 2 shows a sectional view through the reducing agent pump 11 for delivering liquid reducing agent. This reducing agent pump 11 is an electromagnetic reciprocating piston pump, often also referred to as a magnetic piston pump. It has a cylindrical pump body 111 and an electromagnetic 112 which is pushed over the pump body and has a coil winding. The coil winding is fitted to a coil carrier 113. The pump body 111 comprises a tube 114, which is thin-walled with respect to its diameter and is made from a material which is resistant to reducing agent, for example from special steel. A piston 115 which can be moved in a reciprocating manner through energization of the coil winding of the electromagnet 112 is located in the tube 114.

At one of its free ends, the tube 114 is closed off by a pump inlet part 116, which is of two-piece design, and at its other free end it is closed off by a pump outlet part 117, which is likewise of two-piece design.

The pump inlet part 116 comprises a single-piece, cylindrical base body 118, which projects into the tube 114, is matched to the inner diameter of the tube 114 and, at its end which projects out of the tube 114, has a cylindrical connection piece 119, which is tapered with respect to the diameter of the base body 118, and a cylindrical closure part or closure element 120 for fixing the base body 118 in the tube 114. The connection piece or stub 119 is used for connection of a reducing agent line, in particular a hose connection leading to the reducing agent tank 10 (FIG. 1).

The closure element 120 has a central bore 121 for the connection piece 119 to pass through and, on its outer contour, a screw thread 122 which interacts with a mating screw thread 123 on a shoulder 124 of the coil carrier 113. The shoulder 124 is designed as a ring which projects from the end side of the coil carrier 113 and the internal diameter of which is greater than the diameter of the tube 114. The axial length of the shoulder 124 is in this case such that, after the base body 118 has been introduced into the tube 114 and a screw connection has been effected between the end side of the coil carrier 113 and that side of the closure element 120 which faces this end side, by means of the closure element or part 120, a cavity is formed in the shape of a cylindrical chamber 125. A spring element 126 is disposed in this chamber 125, in such a manner that when the closure part 120 has been screwed into place, the base body 118 is fixed resiliently in the tube 114. The spring element 126 illustrated in FIG. 2 is a cup spring. However, it is also possible to use other spring elements, such as for example coil springs, spring discs, or the like.

On its circumference, the base body 118 has a radial groove, not indicated in more detail, for receiving a radial sealing element 127. The radial sealing element 127 used is preferably what is known as an O-ring seal.

The base body 118 and the connection piece which is formed integrally thereon have a continuous, central passage 128, wherein reducing agent is passed to the piston 115. The piston likewise has a central passage 129, within which, on the side facing the pump inlet part 116, a chamber 135, wherein a piston check valve or non-return valve 130 is arranged, is formed. This piston check valve 130, in the case illustrated, comprises, in the customary way, a ball and a spring element acting on the ball, so that the passage 129 can be closed as required.

The pump outlet part 117 is constructed in substantially the same way as the pump inlet part 116, and consequently only the differences will be dealt with in this context. The cylindrical base body 136 of the pump outlet part 117 has a chamber 131, wherein an outlet check valve 132 is arranged, as part of its central passage 128, on the side facing the piston 115. This outlet check valve 132, in the case illustrated, comprises, in the customary way, a ball and a spring element acting on the ball, so that the passage 128 can be closed as required.

The connection piece 133 which is formed integrally at the free end of the base body of the pump outlet part 117 is used for connection of a reducing agent line, in particular a hose connection, which leads directly or indirectly to the metering valve 15 (FIG. 1).

A spring element 134, which biases the piston 115 towards the pump inlet part 116, is provided in the space in the tube 114 which is delimited by the end face of the piston 115 which faces the pump outlet part 117 and the end face of the base body of the pump outlet part 117 which faces the piston 115.

A configuration of this nature safely protects the reciprocating piston pump 11 from being destroyed as a result of an excessively high pressure being produced in the event of the reducing agent freezing, with an associated increase in its volume. At a defined maximum pressure, the base body 118 is pressed outward, counter to the spring force of the spring element 126. The spring element 126 provides a defined force which corresponds to the product of the maximum pressure—which is determined for example by tests—and the cross section of the tube 114. As a result, the increase in volume of the reducing agent inside the reciprocating piston pump 11 can be absorbed by the axial displacement of the base body 118. The radial sealing between base body 118 and tube 114 by means of an O-ring seal permits this axial displacement.

An exemplary embodiment wherein pump inlet and pump outlet are mounted resiliently has been explained with reference to FIG. 2. However, it is also possible for just one side of the pump, wherein case preferably the pump inlet, to be mounted resiliently. The pump outlet part 117 could then be a single-piece design, i.e. base body and closure part are screwed to the coil carrier as a single part.

Because of the working principle of the reciprocating piston pump (piston stroke movement, not reliably self-priming), the pump is arranged at a lower level than the reducing agent tank (FIG. 1).

I claim:

1. A reducing agent pump for delivering liquid reducing agent to an exhaust-gas aftertreatment system of an internal combustion engine, comprising;
- a cylindrical pump body;
- a coil carrier surrounding said pump body and serving to receive an electromagnet;
- a piston disposed to execute an axial movement in said pump body when said electromagnet is being energized;
- a pump inlet part and a pump outlet part closing off said pump body at respective ends thereof, each of said inlet part and said outlet part having a central flow passage, at least one of said pump inlet part and said pump outlet part forming a two-piece part having a first element including said central flow passage and a closure element which is fixedly mounted; and
- a spring element disposed to bias said first element relative to said closure element and to allow a relative movement between said first element and said closure element when a pressure exceeds a spring force of said spring element.

2. The reducing agent pump according to claim 1, wherein at least one of said pump inlet part and said pump outlet part comprises a cylindrical base body forming said first element and projecting into said pump body, and said closure element.

3. The reducing agent pump according to claim 2, wherein said base body is displaceably mounted in said pump body and said closure element is fixedly connected to said coil carrier.

4. The reducing agent pump according to claim 3, wherein said spring element is braced between mutually facing end faces of said base body and said closure element, respectively.

5. The reducing agent pump according to claim 1, wherein said spring element is a spring selected from the group consisting of a cup spring, a spring disc, and a coil spring.

6. The reducing agent pump according to claim 1, wherein said closure element is screwed to said coil carrier.

7. The reducing agent pump according to claim 2, wherein said base body is formed with a connection piece for receiving a reducing agent line.

8. The reducing agent pump according to claim 2, wherein said base body has a periphery formed with a groove and a radial sealing element mounted in said groove, said sealing element establishing a seal in the event of an axial movement of said base body within said pump body.

* * * * *